United States Patent
Wang et al.

(10) Patent No.: US 8,122,176 B2
(45) Date of Patent: Feb. 21, 2012

(54) SYSTEM AND METHOD FOR LOGGING SYSTEM MANAGEMENT INTERRUPTS

(75) Inventors: Bi-Chong Wang, Austin, TX (US); Vijay Nijhawan, Austin, TX (US); Madhusudhan Rangarajan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 429 days.

(21) Appl. No.: 12/361,814

(22) Filed: Jan. 29, 2009

(65) Prior Publication Data

US 2010/0192029 A1    Jul. 29, 2010

(51) Int. Cl.
   *G06F 13/24*    (2006.01)
(52) U.S. Cl. .................... 710/261; 710/263; 710/267
(58) Field of Classification Search ........... 710/260–269
    See application file for complete search history.

(56) References Cited

U.S. PATENT DOCUMENTS

| | | | | |
|---|---|---|---|---|
| 6,093,213 | A | 7/2000 | Favor et al. | 703/27 |
| 6,453,278 | B1 | 9/2002 | Favor et al. | 703/27 |
| 6,742,066 | B2 * | 5/2004 | Emerson et al. | 710/260 |
| 7,200,701 | B2 | 4/2007 | Stultz | 710/267 |
| 7,447,818 | B2 * | 11/2008 | Emerson et al. | 710/260 |
| 7,613,861 | B2 * | 11/2009 | Rangarajan et al. | 710/268 |
| 7,689,750 | B2 * | 3/2010 | Hawk et al. | 710/268 |
| 2005/0102447 | A1 * | 5/2005 | Stultz | 710/33 |
| 2005/0102457 | A1 | 5/2005 | Stultz | 710/260 |
| 2006/0179199 | A1 | 8/2006 | Stern et al. | 710/268 |
| 2007/0088988 | A1 | 4/2007 | Gupta et al. | 714/48 |
| 2008/0040524 | A1 * | 2/2008 | Zimmer et al. | 710/267 |
| 2008/0082710 | A1 * | 4/2008 | Nijhawan et al. | 710/260 |
| 2008/0082711 | A1 | 4/2008 | Wang et al. | 710/260 |
| 2008/0263253 | A1 * | 10/2008 | Sedeh et al. | 710/308 |
| 2009/0172232 | A1 * | 7/2009 | Zimmer et al. | 710/268 |
| 2009/0235005 | A1 * | 9/2009 | Hawk et al. | 710/268 |

OTHER PUBLICATIONS

U.S. Appl. No. 11/838,409, entitled System and Method of Obtaining Error Data Within an Information Handling System, Rangarajan et al., 27 pages, Aug. 14, 2007.
U.S. Appl. No. 12/145,570, entitled "Synchronizing Processors When Entering System Management Mode", Herzi et al., 15 pages, Jun. 25, 2008.

* cited by examiner

*Primary Examiner* — Raymond Phan
(74) *Attorney, Agent, or Firm* — Baker Botts L.L.P.

(57) ABSTRACT

In accordance with certain embodiments of the present disclosure, an information handling system is provided. The information handling system may include a plurality of processors, each processor comprising multiple cores, a memory system coupled to the plurality of processors, and a controller coupled to the plurality of processors. The controller may be configured to: receive a local system management interrupt (SMI) signal regarding an error associated with at least one of the multiple cores, determine that the received local SMI signal triggers a global SMI based on a global SMI trigger rule, cause the plurality of processors to enter a global system management mode (SMM), and log the error in a shared resource shared by the plurality of processors during the global SMM.

17 Claims, 2 Drawing Sheets

SYSTEM AND METHOD FOR LOGGING SYSTEM MANAGEMENT INTERRUPTS

TECHNICAL FIELD

The present disclosure relates to memory, and more particularly, systems and methods for logging correctable memory errors.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as, but not limited to, financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems can experience recoverable or correctable errors during normal system operation, including, for example, when memory devices fail. To increase system reliability, information handling systems are often designed to capture and log recoverable or correctable errors as they occur, allowing for defective memory device(s) to be repaired or replaced.

Information handling systems often route errors to be logged by generating System Management Interrupt (SMI) signals. An SMI may be sent by a controller (e.g., Southbridge) to a processor, which then pauses, or freezes, ongoing system processes. These pauses in processing caused by the SMI enable the Basic-Input-Output System (BIOS) residing on the system to log the recoverable errors as they occur, using the SMI handler. Once the BIOS logs the errors, the SMIs end, and the system may resume performing any interrupted processes. The Baseboard Management Controller (BMC), which manages the interface between system management software and platform hardware, processes the error logging commands received from the BIOS and does the actual writing to its non-volatile memory.

However, when an information handling system includes a multi-processor, multi-core configuration, each core may have to enter an SMI when an error is detected. In this case, each core has to save the current state of the core, enter SMI, sync up after the interrupt, restore the state of the core, and exit SMI, thus suspending some or all processing on the information handling system, causing increased latencies.

SUMMARY

In accordance with certain embodiment of the present disclosure, an information handling system is provided. The information handling system may include a plurality of processors, each processor comprising multiple cores, a memory system coupled to the plurality of processors, and a controller coupled to the plurality of processors. The controller may be configured to: receive a local system management interrupt (SMI) signal regarding an error associated with at least one of the multiple cores, determine that the received local SMI signal triggers a global SMI based on a global SMI trigger rule, cause the plurality of processors to enter a global system management mode (SMM), and log the error in a shared resource shared by the plurality of processors during the global SMM.

In accordance with certain embodiments, an apparatus including a controller coupled to a plurality of processors, each processor comprising multiple cores is provided. The controller may be configured to: receive a local system management interrupt (SMI) signal regarding an error associated with at least one of the multiple cores, determine that the received local SMI signal triggers a global SMI based on a global SMI trigger rule, cause the plurality of processors to enter a global system management mode (SMM), and log the error in a shared resource shared by the plurality of processors during the global SMM.

In accordance with certain embodiments, a method for logging system management interrupts for an information handling system comprising a plurality of processors, each processor including multiple cores is provided. The method includes receiving a local system management interrupt (SMI) signal regarding an error associated with at least one of the multiple cores, determining that the received local SMI signal triggers a global SMI based on a global SMI trigger rule, causing the plurality of processors to enter a global system management mode (SMM), and logging the error in a shared resource shared by the plurality of processors during the global SMM.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
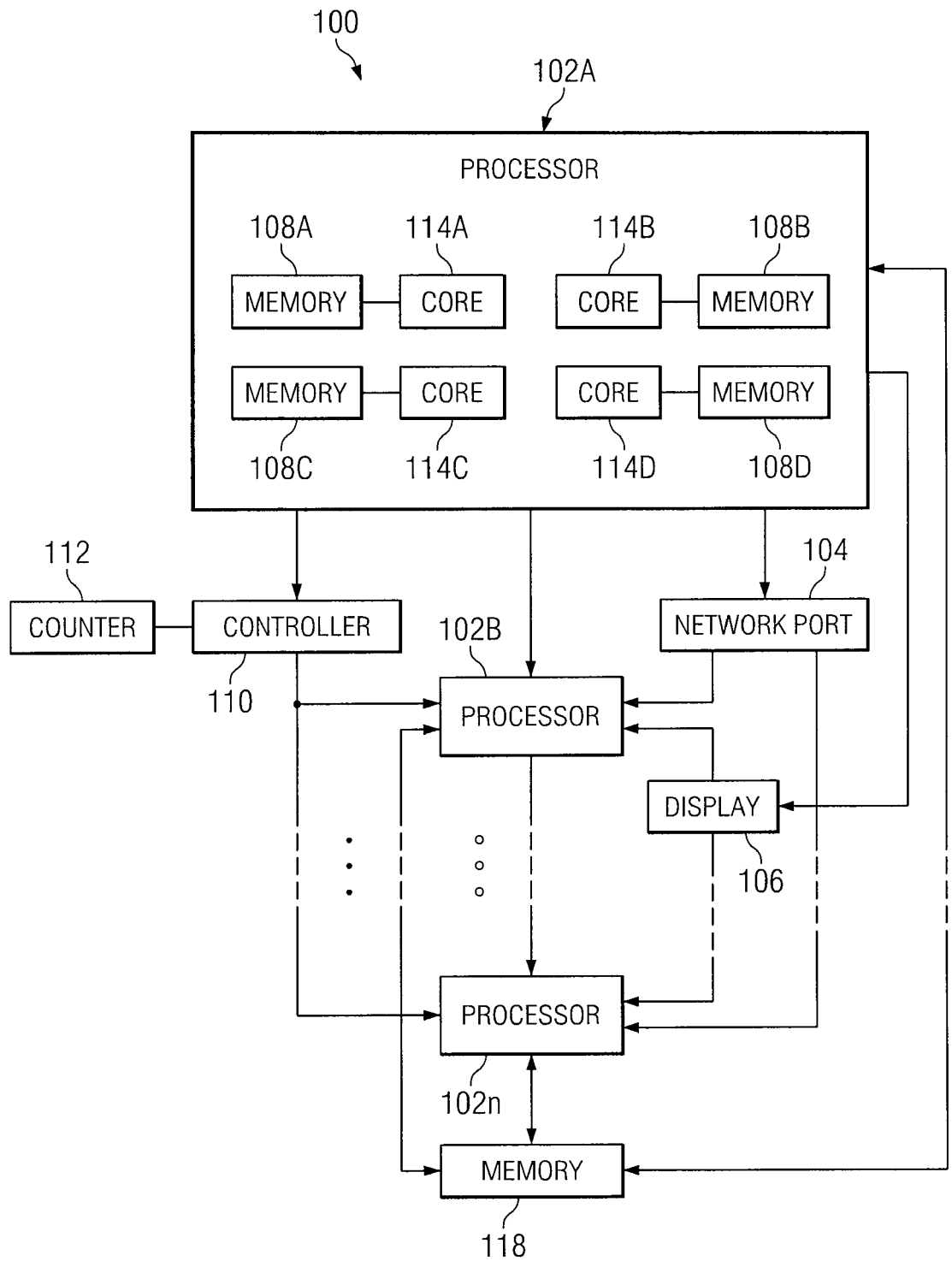
FIG. 1 illustrates a block diagram of an example information handling system including a controller configured to log system management interrupts, in accordance with certain embodiments of the present disclosure.
Figure 2:
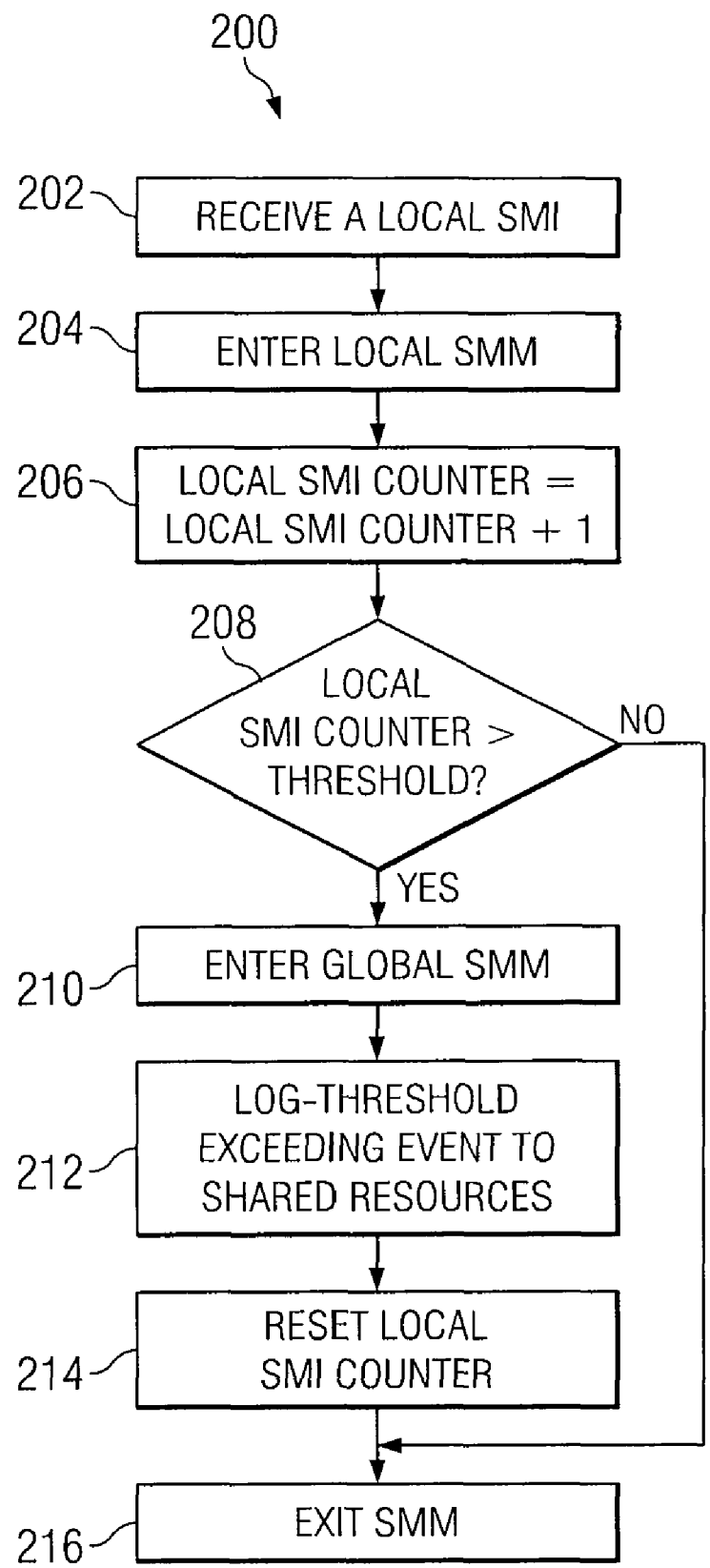
FIG. 2 illustrates a flow chart of an example method for logging system management interrupts, in accordance with certain embodiments of the present disclosure.

Preferred embodiments and their advantages are best understood by reference to FIGS. 1 and 2, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and/or a video display. The information handling system may also include one or more buses operable to transmit communications between the various hardware components.

FIG. 1 illustrates a block diagram of an example information handling system 100 including a controller configured to log system management interrupts, in accordance with certain embodiments of the present disclosure. As shown in FIG. 1, information handling system 100 may include one or more processors 102, a network port 104, a display 106, memories 108 and 118, a controller 110, and a local SMI counter 112.

Each processor 102 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in, for example, one or more memories 108, memory 118, and/or another component of information handling system 100 and may output results, graphical user interfaces (GUIs), websites, and the like via display 106 or over network port 104.

In one embodiment, each processor 102 may include a multi-core system (e.g., dual-core, quad-core, etc.) that includes two or more independent cores in a single package configured for multiprocessing (e.g., interpret and/or execute program instructions and/or process data). In the example shown in FIG. 1, processor 102A may include a quad-core system having four cores (114A, 114B, 114C, and 114D), where each core 114 includes at least a single integrated circuit (IC), or die.

Network port 104 may be any suitable system, apparatus, or device operable to serve as an interface between information handling system 100 and a network. Network port 104 may enable information handling system 100 to communicate over a network using any suitable transmission protocol and/or standard, including without limitation all transmission protocols and/or standards known in the art.

Display 106 may comprise any display device suitable for creating graphic images and/or alphanumeric characters recognizable to a user, and may include, for example, a liquid crystal display (LCD) or a cathode ray tube (CRT).

Memories 108 and 118 may be coupled to processor(s) 102 and may comprise any system, device, or apparatus operable to retain program instructions or data for a period of time. In certain embodiments, memory 108 and/or memory 118 may be integral component of a non-uniform memory access (NUMA) system. In a NUMA system, access to memory 108 may depend on the location of memory 108 relative to processor 102. In some embodiments, processor 102 may include memory 108 locally (e.g., within or directly coupled to core(s) 114), which may allow for faster memory access compared to, for example, memory shared between the one or more processors 102 and/or cores 114 (e.g., memory 118). For example, in the embodiment shown in FIG. 1, processor 102A includes memory 108A coupled to core 114A, memory 108B coupled to core 114B, memory 108C coupled to core 114C, memory 108D coupled to core 114D. In contrast, memory 118 is shared between processors 102A, 102B, . . . 102n.

In some embodiments, one or more memories 108 may be a local cache configured to temporarily store data copied from, for example, memory 118 allowing processor(s) 102, and particularly, core(s) 114 faster read and/or write access to data stored in one or more memories 108. In the same or alternative embodiments, memories 108 and/or memory 118 may be configured as a multiple level cache configuration. For example, processor 102A may first attempt to find data in a first level cache (L1), e.g., memories 108A, 108B, 108C, and/or 108D. If the data is not stored in the first level cache, processor 102A may attempt to find data in a second level (L2) cache or other memory devices coupled to information handling system 100, e.g., memory 118.

Controller 110 may be communicatively coupled to processor(s) 102 and may include any hardware, software, and/or firmware configured to improve or optimize the handling of SMIs when an error is detected. In some embodiments, controller 110 may generate local SMIs and/or global SMIs in response to detected errors.

A local SMI is an interrupt to a core that may be coupled to a memory device that includes an error (e.g., single bit error). Other components of information handling system 100 may continue processing data and/or instructions while the process of the core with the error is interrupted and the error is logged.

In operation, controller 110 may enable a local SMI allowing a processor 102 that generated an error correcting code to enter a system management mode (SMM). For example, if a correctable memory error (e.g., single bit error) in memory 108A is detected, controller 110 may enable a local SMI that sets only core 114A of processor 102A into SMM and prevents the other cores of processor 102A (e.g., cores 114B, 114C, and/or 114D) from unnecessarily entering the SMM.

A global SMI is an interrupt to one or more components of information handling system 100 (e.g., an interrupt to one or more cores 114, and in some embodiments, all cores 114). In some embodiments, global SMIs may be triggered by the occurrence of one or more errors, according to predefined global SMI trigger rules. For example, a global SMI trigger rule may be based at least on a number of local SMIs received by controller 110. Local SMI counter 112 may be either a software- and/or hardware-based controller and may be coupled to controller 110 may be incremented by one each time a local SMI signal (e.g., an SMI entry) is received by controller 110 from core(s) 114. In one embodiment, local SMI counter 112 may be a configuration space register or other suitable registers configured to record the number of SMI entries received by controller 110 from core(s) 114.

If the number of SMI entries received exceeds a threshold (e.g., some predetermined value automatically set by information handling system 100 and/or manually set by a user), controller 110 initiates a global SMI causing components of information handling system 100 including cores 114 to enter global SMM. In the global SMM, processor(s) 102 may save the current state of appropriate core(s) 114 and controller 112 may log the threshold-exceeding error in the shared resources between processors 102 (e.g., baseboard management controller (BMC), complimentary metal oxide semiconductor (CMOS) data stored in a read-accessible memory (RAM), etc.). Once the errors have been logged, the one or more processors 102 may sync up, restore the state of core(s) 114, and exit SMM. The use of a global SMI allows shared resources between processors 102A, 102B, . . . 102n to be safely accessed and error data, e.g., threshold-exceeding error (s), to be stored accurately. Details of the logging of errors during a global SMI are described with respect to FIG. 2.

FIG. 2 illustrates a flow chart of an example method 200 for logging system management interrupts, in accordance with certain embodiments of the present disclosure. At step 202, controller 110 may receive from processor(s) 102 a local SMI signal, indicating an error has occurred. For example, a failure (e.g., single bit error) in memory 108A coupled to a core 114A may have occurred and a SMI signal may have been generated by either core 114A associated with failed memory 108A and/or processor 102A associated with the failed memory 108A.

At step 204, core 114 may enter into a local SMI. For example, if the failure occurred in memory 108A coupled to core 114A, core 114A may enter into local SMI while the other cores 114B, 114C, and 114D may continue processing data and/or information. Processing in core 114A may be interrupted and the error be logged by, for example, local SMI counter 112.

At step 206, after entering the local SMI, controller 110 and/or information handling system 100 may increment local SMI counter 112 by one.

At step 208, controller 110 may determine if the value of local SMI counter 112 exceeds a threshold value predetermined by information handling system 100 or manually set by a user. If the counter does not exceed the threshold value, method 200 may proceed to step 216. If the value of local SMI counter 112 exceeds the threshold, method 200 may proceed to step 210-214 for logging the error(s).

At step 210, because the value of local SMI counter 112 exceeds the threshold value a global SMI is initiated and all processors 102 may enter SMM. Controller 110 may send a signal to processors 102 causing processors 102 to enter the global SMI such that shared resources between processors 102 (e.g., baseboard management controller, complimentary metal oxide semiconductor (CMOS) data of chipset, etc.) may be safely accessed by the SMI handler. In one embodiment, some or substantially all processes on processors 102 may be suspended and the current state of core(s) 114 associated with processors 102 entering SMM may be recorded. For example, referring to the embodiment shown in FIG. 1, processors 102A, 102B . . . 102n may all enter SMM, and the current state of cores 114 associated with such processors may be recorded.

In some embodiments, the global SMI may be generated within the local SMI (e.g., springboarding). In other embodiments, the local SMI may be exited before initiating the global SMI.

At step 212, controller 110 may log the threshold-exceeding event to the shared resources between processors 102. In one embodiment, controller 110 may log the threshold-exceeding event (e.g., time, date, value of local SMI counter 112, etc.) to a baseboard management controller. In the same or alternative embodiments, controller 110 may set a flag in complimentary metal oxide semiconductor (CMOS) data stored in, for example, a random access memory (RAM) of chipset. By pausing the activities of processors 102 and by pausing the access to the shared resources between processors 102, the threshold-event may be safely and accurately recorded.

At step 214, controller 110 may reset the local SMI counter 112. In one embodiment, controller 110 may set the counter value to zero.

At step 216, processors 102 may exit the SMM mode. In one embodiment, processors 102 may sync up, restore the state of core(s) 114 associated with processors 102, exit SMI, and resume processing data and/or program instructions.

Although the present disclosure has been described in detail, it should be understood that various changes, substitutions, and alterations can be made hereto without departing from the spirit and the scope of the invention as defined by the appended claims.

What is claimed is:

1. An information handling system comprising:
a plurality of processors, each processor comprising multiple cores;
a memory system coupled to the plurality of processors; and
a controller coupled to the plurality of processors and configured to:
receive a local system management interrupt (SMI) signal regarding an error in at least one of a baseboard management controller (BMC) and a complimentary metal oxide semiconductor (CMOS) data stored in a random access memory (RAM), the error associated with at least one of the multiple cores;
determine that the received local SMI signal triggers a global SMI based on a global SMI trigger rule;
cause the plurality of processors to enter a global system management mode (SMM); and
log the error in a shared resource shared by the plurality of processors during the global SMM.

2. The information handling system of claim 1, wherein the memory system comprises a non-uniform memory access (NUMA) system.

3. The information handling system of claim 2, wherein the memory system comprises memory directly coupled to each core of the multiple cores.

4. The information handling system of claim 1, wherein the multiple cores comprises a dual-core configuration or a quad-core configuration.

5. The information handling system of claim 1, further comprising a counter configured to log the number of local SMI signals received by the controller.

6. The information handling system of claim 5, wherein the controller is configured to increment a value of the counter upon receiving the local SMI signal.

7. The information handling system of claim 6, wherein the controller is further configured to determine if the incremented value exceeds a predetermined threshold.

8. An apparatus comprising a controller coupled to a plurality of processors, each processor comprising multiple cores, the controller configured to:
receive a local system management interrupt (SMI) signal regarding an error in at least one of a baseboard management controller (BMC) and a complimentary metal oxide semiconductor (CMOS) data stored in a random access memory (RAM), the error associated with at least one of the multiple cores;
determine that the received local SMI signal triggers a global SMI based on a global SMI trigger rule;
cause the plurality of processors to enter a global system management mode (SMM); and
log the error in a shared resource shared by the plurality of processors during the global SMM.

9. The apparatus of claim 8, further comprising a counter configured to log the number of local SMI entries received by the controller.

10. The apparatus of claim 8, wherein the multiple cores comprises a dual-core configuration or a quad-core configuration.

11. The apparatus of claim 9, wherein upon receiving the local SMI signal, the controller is configured to increment a value of the counter by one.

12. The apparatus claim 11, wherein the controller is further configured to determine if the incremented value exceeds the global SMI trigger event.

13. The apparatus of claim 12, wherein the global SMI trigger rule comprises a number of local SMI entries received by the controller logged by the counter before a global SMI is enabled.

14. A method for logging system management interrupts for an information handling system comprising a plurality of processors, each processor including multiple cores, the method comprising:

receiving a local system management interrupt (SMI) signal regarding an error in at least one of a baseboard management controller (BMC) and a complimentary metal oxide semiconductor (CMOS) data stored in a random access memory (RAM), the error associated with at least one of the multiple cores;

determining that the received local SMI signal triggers a global SMI based on a global SMI trigger rule;

causing the plurality of processors to enter a global system management mode (SMM); and logging the error in a shared resource shared by the plurality of processors during the global SMM.

15. The method of claim 14, wherein the global SMI trigger rule comprises a number of local SMI signals received by the controller, the number of local SMI signals logged by a counter coupled to the controller.

16. The method of claim 14, wherein logging the error comprises logging the global SMI trigger rule to a baseboard management controller.

17. The method of claim 15, further comprising determining if the number of local SMI signals logged by the counter exceeds the global SMI trigger event.

\* \* \* \* \*